United States Patent [19]

Schubert et al.

[11] Patent Number: 4,995,547

[45] Date of Patent: Feb. 26, 1991

[54] PROCESS FOR BRAZING A METAL OBJECT TO A CERAMIC SURFACE DEFINING A HOLE FOR RECEIVING THE METAL OBJECT

[75] Inventors: W. Peter Schubert, Lafayette; Thomas A. Wilke, Boulder, both of Colo.

[73] Assignee: Paradygm Science & Technologies, Inc., Boulder, Colo.

[21] Appl. No.: 532,590

[22] Filed: Jun. 4, 1990

[51] Int. Cl.[5] .................... B23K 1/19; B23K 31/02; B23K 103/16
[52] U.S. Cl. .................................. 228/124; 228/217; 228/239; 228/255; 228/263.21
[58] Field of Search .............. 228/217, 239, 122–124, 228/255, 263.12, 263.21

[56] References Cited

U.S. PATENT DOCUMENTS

| | | | |
|---|---|---|---|
| 3,768,985 | 10/1973 | Woodward | 228/263.21 |
| 3,980,220 | 9/1976 | Wolfe et al. | 228/263.21 |
| 4,098,452 | 7/1978 | Webster et al. | 228/123 |
| 4,621,761 | 11/1986 | Hammond et al. | 228/263.21 |

FOREIGN PATENT DOCUMENTS

| | | | |
|---|---|---|---|
| 112678 | 6/1985 | Japan | 228/122 |
| 435648 | 9/1976 | U.S.S.R. | 228/217 |

OTHER PUBLICATIONS

Electronics, "Metal Ceramic Brazed Seals", pp. 97–99, Jul., 1947.

Welding Journal, "Ceramic-to-Metal Joining with Active Brazing Filler Metal", pp. 27–32, Oct., 1985.

*Primary Examiner*—Sam Heinrich
*Attorney, Agent, or Firm*—Sheridan, Ross & McIntosh

[57] ABSTRACT

The present invention provides a method for brazing a metal object to a ceramic surface defining a recess for receiving the metal object where the space between the metal object and the ceramic surface defining the recess inhibits the establishment of the oxygen depleted environment necessary to establish a reliable braze joint. The present invention includes the use of a material having a high affinity for oxygen that is positioned adjacent to the space between the metal object and the ceramic surface defining the recess and serves to pull or draw oxygen from the space to establish the oxygen depleted environment required to produce a reliable braze joint.

18 Claims, 1 Drawing Sheet

PROCESS FOR BRAZING A METAL OBJECT TO A CERAMIC SURFACE DEFINING A HOLE FOR RECEIVING THE METAL OBJECT

FIELD OF THE INVENTION

The present invention relates to a method for brazing a metal object, and in particular a metal pin made of titanium, to a ceramic surface that defines a recess.

BACKGROUND OF THE INVENTION

Brazing is a process where a first material is joined to a second material by a third material, the brazing material. The brazing process typically includes a preparation step where the surfaces of the first and second materials that are to be brazed to one another are cleaned to remove oxides and the like that can adversely affect the integrity of any braze joint subsequently established between the first and second materials. Typically, the surfaces are cleaned by etching or removing the outermost layer of each of the surfaces. Once cleaned, the first and second materials can be brazed to one another. To achieve a high quality braze joint between the first and second materials, brazing must occur in an oxygen depleted atmosphere to inhibit the formation of oxides on the surfaces on the first and second materials that can reduce the ability of the brazing material to wet or adhere to the surfaces. Typically, the oxygen depleted atmosphere is achieved by using a flux that decomposes at or near the melting point of the brazing material and establishes an atmosphere around the surfaces of the materials being brazed that is substantially free of any oxygen.

The process of brazing a metal to a ceramic is extremely sensitive to oxidation. Consequently, it is generally carried out in a vacuum furnace where the vacuum and the flux cooperate to achieve the oxygen depleted atmosphere adjacent to the surfaces of the metal and the ceramic that is necessary to achieve a reliable braze joint. Presently, however, the ability to braze a metal to a ceramic is limited to situations where the surfaces of the metal and the ceramic have a high degree of exposure and, as a consequence, present relatively little resistance to the establishment of the requisite oxygen depleted atmosphere. There are situations, however, where the surfaces of the metal and the ceramic are not exposed enough for the flux and the vacuum of the furnace to establish the necessary oxygen depleted atmosphere. An exemplary situation is where the metal object must be brazed into a recess established in a ceramic object. In this situation, the space between the surface of the metal object and the ceramic surface defining the recess inhibits the removal of oxygen, even when a vacuum furnace and flux are utilized. Consequently, a reliable braze joint cannot be established between the metal object and the ceramic surface defining the recess.

A specific application where this problem arises is in mass spectrometers that include a ceramic housing with a hollow interior where a low-pressure or vacuum environment is maintained and various electrical components are located. The electrical components located within the housing must be connected to control and/or processing circuitry located exterior to the housing. To achieve such a connection and preserve the vacuum environment, one or more holes must be established between the exterior of the housing and the interior of the housing, a distance that is typically an inch or more, and a solid metal pin that is capable of conducting the necessary signals must be brazed to the ceramic surface defining the hole. Due to the length of the hole and the relatively small clearance between the metal pin and the surface of the ceramic surface defining the hole, there is a high degree of resistance to the establishment of an oxygen depleted environment adjacent to the surface of the metal pin and the ceramic surface defining the hole. Consequently, the reliability of any braze joint subsequently established between the surfaces using only a vacuum furnace and a flux is questionable. Moreover, to reduce undesirable magnetic effects on the operation of the mass spectrometer, the metal pin is made of titanium, which is a non-magnetic material. Unfortunately, titanium has a high affinity for oxygen that makes the establishment of the requisite oxygen depleted atmosphere even more difficult.

Based on the foregoing, there is a need for a process that allows a metal object to be brazed to a ceramic surface that defines a recess for receiving the metal object where the space between the metal object and the ceramic surface provides substantial resistance to the establishment of the oxygen depleted environment necessary to produce a reliable braze joint. The need for such a process is especially noticeable where the metal object is made of titanium.

SUMMARY OF THE INVENTION

The present invention provides a method for brazing a metal object to a ceramic surface defining a recess for receiving the metal object where the space between the metal object and the ceramic surface provides substantial resistance to the establishment of the oxygen depleted environment necessary to establish a reliable braze joint between the metal object and the ceramic surface.

In the preferred process, the surface of the metal object and the ceramic surface defining the recess, between which a braze joint is to be established, are etched to remove oxides and the like that can adversely affect any braze joint subsequently established therebetween. The preferred process also includes applying a flux to the surface of the metal object. Alternatively or additionally, flux can be applied to the ceramic surface defining the recess. If the metal object is made of titanium, then a flux that includes titanium hydride is preferably utilized. Once the surfaces have been cleaned and the surface of the ceramic fluxed, the metal object is positioned within the recess. Alternatively, the metal object can be placed in the recess and the flux can then be injected into the space between the metal object and the ceramic surface defining the recess. This, however, is generally not practical. The preferred process also includes locating a brazing material adjacent to and in contact with an exposed portion of the space between the metal object and the ceramic surface so that when the brazing material melts, it will flow into the space between the metal object and the ceramic surface to establish a braze joint therebetween. Preferably, the brazing material is a eutectic brazing material made from silver and copper. Also positioned adjacent the same or another exposed portion of the space between the metal object and the ceramic surface is a material having a high affinity for oxygen. In the preferred process, this material is titanium.

The assembly comprising the metal object, the object with the ceramic surface defining the recess, the brazing material and the material having a high affinity for oxygen is then heated in a vacuum oven to establish a braze joint between the metal object and the ceramic surface. During this step, the flux decomposes and the oxygen located in the space between the metal object and the ceramic surface is, to an extent, displaced by one or more of the by-products of the decomposition. If a flux that includes titanium hydride is utilized, decomposition of the flux results in the production of hydrogen that, due to its high affinity for the surfaces of the metal object and the ceramic, displaces the oxygen. Due, however, to the relatively high resistance of the space between the metal object and the ceramic surface to the removal of oxygen, a significant amount of oxygen remains in the space. The material having a high affinity for oxygen pulls or draws, in effect, a substantial portion of this oxygen out of the space to establish the oxygen depleted atmosphere necessary for the production of a reliable braze joint.

To account for differences in the thermal expansion or thermal contraction of the metal object and the ceramic that could cause the metal object to fracture the ceramic, the temperature and the rate of temperature change of the vacuum furnace are controlled or regulated so that the ceramic can accommodate the expansion of the metal object. This control or regulation applies to both heating and cooling cycles.

DETAILED DESCRIPTION

The present invention provides a method for brazing a metal object to a ceramic surface defining a recess for receiving the metal object where the space between the metal object and the ceramic surface inhibits the establishment of the oxygen depleted atmosphere that is required to produce a reliable braze joint.

Figure 1:
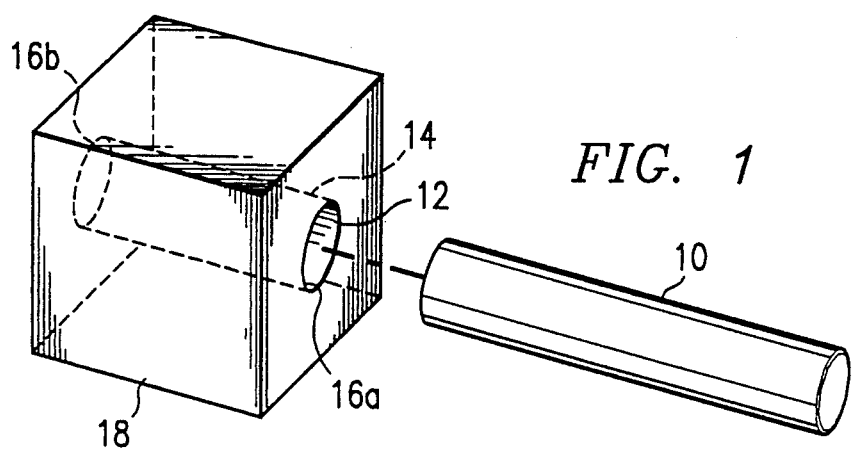
FIG. 1 illustrates a ceramic material with a hole for receiving a titanium pin.
Figure 2:
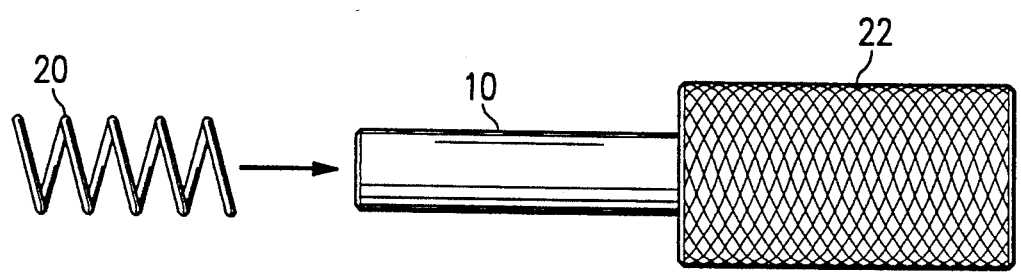
FIG. 2 illustrates the knurled pin tool used to install the braze helix on the titanium pin after the titanium pin has been etched.
Figure 3:
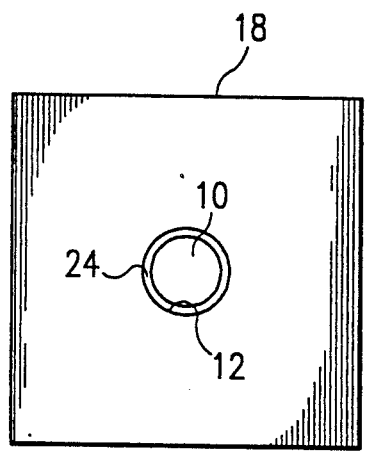
FIG. 3 illustrates the relatively small space between the titanium pin and the ceramic surface that defines the hole for receiving the titanium pin.
Figure 4:
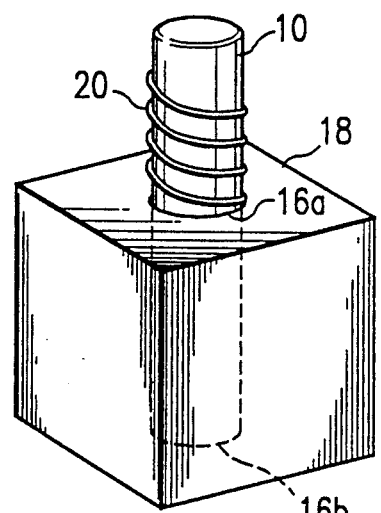
FIG. 4 illustrates the assembly comprising the ceramic object with the titanium pin located in the hole, the braze material located adjacent to one opening of the hole, and the titanium material located adjacent to the other opening of the hole.

With reference to FIGS. 1 and 2, the invention is hereinafter described with respect to the brazing of a titanium pin 10 to a ceramic surface 12 that defines a hole or recess 14 extending from a first opening 16a to a second opening 16b in a ceramic object 18 made of a machinable, glass-mica ceramic, such as MACOR, with a brazing material 20. It should be appreciated, however, that the invention is applicable to the brazing of many types of metal to many types of ceramics.

The preferred method includes cleaning or etching the titanium pin 10 to remove oils, oxidations products, and the like that can adversely affect the integrity of any braze joint subsequently established between the titanium pin 10 and the ceramic surface 12. The step of cleaning the titanium pin 10 includes placing the titanium pin 10 in a bath of solvent, such as acetone trichlorethylene, to remove oils and the like from the surface of the titanium pin 10. Preferably, the bath is located in an ultrasonic cleaner that aids in the removal of oils and the like. After being treated with the solvent, the titanium pin 10 is placed in a 2%–4% hydrofluoric acid solution for approximately 30 seconds to etch or remove the outermost layer of the titanium pin 10 and expose a surface that is substantially free of any contaminants that can adversely affect the braze joint. After the titanium pin 10 has been etched, it is immediately rinsed in water to remove the hydrofluoric acid and thereby prevent the surface of the titanium pin 10 from being further etched. After the titanium pin 10 has been rinsed, it is ultrasonically washed for approximately five minutes in boiling, de-ionized water to further clean the surface of the titanium pin 10 and insure that all of the hydrofluoric acid has been removed. The titanium pin 10 is then affixed to a knurled pin tool 22 so that it can be handled without contacting and possibly contaminating the cleaned surface.

The preferred process further includes cleaning the brazing material 20 with a soap, such as MICRO soap, and hot water. After the braze material 20 is cleaned it is rinsed in hot, de-ionized water and dried in an oven. Preferably, the braze material is a 72% silver-28% copper alloy that, because it has a lower melting point than either of its constituents, reduces the temperature necessary to establish a braze joint. Other alloys that exhibit this property, known as eutectic alloys, are also feasible.

Preferably, the brazing material 20 is in the form of a helix that, with the aid of the knurled pin tool 22, is wound or twisted onto the titanium pin 10.

The preferred process also includes cleaning the ceramic surface 12 to remove contaminants that can inhibit the formation of a reliable braze joint. Preferably, the ceramic surface 12 is cleaned for several minutes in an ultrasonic cleaner with a solution of soap, such as MICRO soap, and hot water. After the ceramic surface 12 has been cleaned, it is rinsed with hot, de-ionized water to remove contaminants still adhering to the ceramic surface 12. After being rinsed, the ceramic object 18 is dried in an oven at 100° C.

The preferred process also includes fluxing the ceramic surface 12 of the ceramic object 18 using a flux that includes titanium hydride ($TiH_2$). A suitable $TiH_2$ flux can be made by mixing one gram of titanium hydride with two cubic centimeters of ethylene glycol. The $TiH_2$ flux made with ethylene glycol, after application to the ceramic surface, is allowed to dry. By allowing the flux to dry, undesirable chemical reactions between the ethylene glycol and the titanium pin 10, when the titanium pin 10 is subsequently positioned in the recess 14, are avoided.

Once the titanium pin 10 and the ceramic surface 12 of the ceramic object 18 have been cleaned and the titanium hydride flux has been applied to the ceramic surface 12, the titanium pin 10 is positioned in the recess 14 so that it can be brazed to the ceramic surface 12. Between the titanium pin 10 and the ceramic surface 12 is a space 24 that eventually accommodates the brazing material 20. The positioning of the titanium pin 10 in the recess 14 also positions the braze material 20, which is wound around the titanium pin 10, adjacent to the first opening 16a of the recess 14. Consequently, when the brazing material 20 melts, it will flow into the space 24 with the aid of capillary action. Other methods of positioning brazing material adjacent to the space 24 can, of course, be employed.

The space 24 between the surface of the titanium pin 10 and the ceramic surface 12 exhibits a high resistance to the removal of any oxygen located therein. This resistance can be attributed to the relatively small exposure of the space 24 to the exterior environment. Other factors that can inhibit the removal of oxygen from the space are the length and shape of the space. In one application, a mass spectrometer, the recess 14 is approximately one inch in length and approximately 0.079 inches in diameter and the titanium pin 10 is approximately 0.076 inches in diameter. Consequently, the space 24 between the titanium pin 10 and the ceramic surface 12 is a hollow cylinder having a length of one inch, an outside diameter of 0.079 inches, and an inside diameter of 0.076 inches. In this situation, both the relatively small exposure of the space 24 to the outside environment and the length of the space 24 inhibit the removal of any oxygen therefrom. The use of a titanium pin 10 makes it even more difficult to remove oxygen from the space 24 because titanium has a high affinity for oxygen.

The process further includes positioning the assembly comprising the ceramic object 12 with the titanium pin 10 located in the recess 14 in a vacuum furnace such that the second opening 16b is located adjacent to a material having a high affinity for oxygen 26, such as titanium. In situations where the recess has only one opening, the material having a high affinity for oxygen is positioned adjacent to the opening. For good results, it is important that the vacuum furnace have a cavity that is substantially free of oxidation by-products. A bright silver appearance is a reliable indication that the cavity is substantially free of oxidation by-products in a vacuum furnace that is made primarily of molybdenum. A gray cavity, in contrast, indicates that the cavity has an unacceptable level of oxidation by-products. Vacuum furnaces that are made of graphite necessarily exhibit a gray-colored cavity. However, graphite furnaces typically include one or more molybdenum parts located within the cavity that can be inspected to determine whether or not the cavity is substantially free of oxidation by-products.

After placing the assembly in the oven and adjacent to the material having a high affinity for oxygen 26, the vacuum furnace is sealed and pumped down to a pressure of approximately $1 \times 10^{-5}$ torr. This removes a substantial portion of any oxygen as well as any other gasses in the cavity. The vacuum furnace is then flooded with argon, an inert gas whose presence in the cavity is preferred to oxygen because it does not cause oxidation or nitrites on the surfaces. The vacuum furnace is then pumped down to $1 \times 10^{-5}$ torr and the temperature therein increased. At or near the melting point of the brazing material 20, the titanium hydride flux decomposes and produces hydrogen. The hydrogen, because it has a high affinity for the titanium pin 10 and the ceramic surface 12, displaces a substantial portion of the oxygen adhering to the titanium pin 10 and the ceramic surface 12. The space 24, however, presents substantial resistance to the removal of the displaced oxygen therefrom. The material having a high affinity for oxygen 26, however, overcomes this resistance and, in effect, draws the displaced oxygen out of the space 24. At 1510° F., the brazing material 20 melts and is drawn into the space 24 by capillary action to establish the braze joint between the titanium pin 10 and the ceramic surface 12.

Figure 5:
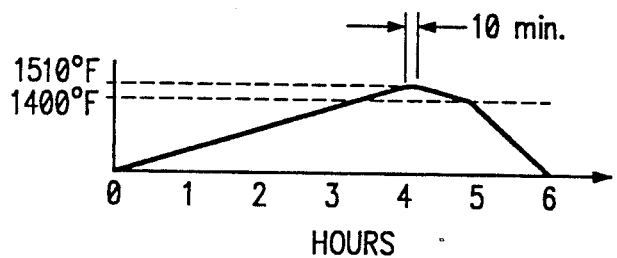
FIG. 5 illustrates the preferred temperature profile of the vacuum furnace that is used to prevent any adverse effects that can be attributed to differences in the expansion and/or contraction of the titanium pin and the ceramic.

With reference to FIG. 5, the temperature of the vacuum furnace is increased according to a temperature profile that reduces the possibility of the titanium pin 10 damaging the ceramic surface 12 due to its slightly higher rate of thermal expansion and its higher thermal conductivity. Specifically, the temperature of the oven is increased at a rate of 450° F. per hour until the temperature of the vacuum furnace reaches 1510° F. At 1510° F., the braze material melts and establishes a braze joint between the titanium pin 10 and the ceramic surface 12. The temperature of the vacuum furnace is held at 1510° F. for several minutes to allow the brazing material 20 enough time to penetrate throughout the space 24. To accommodate any difference in the rates of contraction of the titanium pin 10 and the ceramic object 18 that could adversely affect the braze joint, the temperature of the vacuum furnace is also reduced in a controlled fashion. Specifically, the temperature of the vacuum furnace is steadily reduced from 1510° F. to approximately 1400° F. over a period of approximately 50 minutes. The temperature of the vacuum furnace is then steadily reduced from 1400° F. to 200° F. over a period of approximately one hour using argon gas as a coolant.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments with the various modifications required by their particular applications or uses of the invention. It is intended that the appended claims be construed to include alternate embodiments to the extent permitted by the prior art.

What is claimed is:

1. A method for brazing a piece of metal material to a surface defining a recess in a piece of ceramic material, comprising:

providing a metal object;

providing a ceramic object having a surface that defines a recess for receiving said metal object;

providing brazing material;

positioning said metal object in said recess of said ceramic object, wherein a space is defined between said metal object and said surface, said space providing substantial resistance to the removal of oxygen therefrom;

positioning said brazing material to substantially fill said space and establish a joint between said metal object and said surface of said ceramic object when said brazing material is heated to its melting point;

positioning a material having an affinity for oxygen adjacent to said space to attract oxygen from said space; and heating said metal object, said ceramic object, and said brazing material to braze said metal object to said surface of said ceramic object.

2. A method, as claimed in claim 1, wherein:

said steps of providing a metal object and a ceramic object includes cleaning said metal object and said ceramic object.

3. A method, as claimed in claim 1, wherein:
said step of providing a brazing material includes cleaning said brazing material.

4. A method, as claimed in claim 1, wherein:
said metal object includes titanium.

5. A method, as claimed in claim 1, wherein:
said ceramic object includes a glass-mica ceramic.

6. A method, as claimed in claim 1, wherein:
said ceramic object includes MACOR.

7. A method, as claimed in claim 6, wherein:
said metal object includes titanium.

8. A method, as claimed in claim 1, wherein:
said brazing material includes silver and copper.

9. A method, as claimed in claim 1, wherein:
said step of positioning said metal object includes coating at least one of said metal object and said surface defining said recess with a flux.

10. A method, as claimed in claim 9, wherein:
said flux includes titanium hydride.

11. A method, as claimed in claim 1, wherein:
said material having an affinity for oxygen includes titanium.

12. A method, as claimed in claim 1, wherein:
said step of heating includes qualifying a furnace to determine if it is substantially free of oxidation products.

13. A method, as claimed in claim 1, wherein:
said step of heating including using a vacuum furnace.

14. A method, as claimed in claim 1, wherein:
said step of heating includes controlling the temperature to account for a difference in at least one of the following: the rate of thermal expansion and the rate of thermal contraction, of said metal object and said ceramic object.

15. A method for brazing a piece of titanium material to a surface defining a recess in a piece of ceramic material, comprising:
providing a titanium object;
providing a ceramic object having a surface that defines a recess for receiving said titanium object;
providing brazing material;
positioning said titanium object in said recess of said ceramic object, wherein a space is defined between said titanium object and said surface, said space providing substantial resistance to the removal of oxygen therefrom;
positioning said brazing material to substantially fill said space and establish a joint between said titanium object and said surface of said ceramic object when said brazing material is heated to its melting point;
positioning a material having an affinity for oxygen adjacent to said space to attract oxygen from said space; and
heating said titanium object, said ceramic object, and said brazing material to braze said metal object to said surface of said ceramic object.

16. A method, as claimed in claim 15, wherein:
said step of positioning said metal object in said recess includes coating at least one of said titanium object and said surface defining said recess with titanium hydride.

17. A method, as claimed in claim 15, wherein:
said material having an affinity for oxygen includes titanium.

18. A method for brazing a piece of titanium material to a surface defining a recess in a piece of ceramic material, comprising:
providing a first titanium object;
providing a ceramic object having a surface that defines a hole for receiving said metal object;
providing brazing material;
coating at least one of said titanium object and said surface of said ceramic object with a flux that includes titanium hydride;
positioning said first titanium object in said hole of said ceramic object, wherein a space is defined between said first titanium object and said surface, said space providing substantial resistance to the removal of oxygen therefrom;
positioning said brazing material adjacent to said space;
positioning a second titanium object having an affinity for oxygen adjacent to said space to attract oxygen from said space; and
heating said titanium object, said ceramic object, and said brazing material to braze said titanium object to said surface of said ceramic object, wherein said titanium hydride decomposes during said heating to produce hydrogen that displaces oxygen located within said space and said second titanium object attracts said displaced oxygen from said space.

* * * * *